United States Patent
Lee

(10) Patent No.: US 11,953,090 B1
(45) Date of Patent: Apr. 9, 2024

(54) SHIFT CONTROL DEVICE AND A METHOD OF CONTROLLING AN AXLE ASSEMBLY

(71) Applicant: ArvinMeritor Technology, LLC, Troy, MI (US)

(72) Inventor: Thomas Lee, Cwmbran (GB)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 18/330,571

(22) Filed: Jun. 7, 2023

(51) Int. Cl.
| B60W 10/10 | (2012.01) |
| B60W 10/30 | (2006.01) |
| F16H 61/00 | (2006.01) |
| F16H 61/02 | (2006.01) |
| F16H 61/28 | (2006.01) |

(52) U.S. Cl.
CPC ......... F16H 61/0204 (2013.01); B60W 10/10 (2013.01); B60W 10/30 (2013.01); F16H 61/0006 (2013.01); F16H 61/2807 (2013.01); F16H 2061/283 (2013.01)

(58) Field of Classification Search
CPC ............ F16H 61/0204; F16H 61/0006; F16H 61/2807; F16H 2061/283; B60W 10/10; B60W 10/02; B60W 10/30; B60W 50/0358; B60W 50/14
USPC ........................................ 701/51, 53, 66, 64
See application file for complete search history.

(56) References Cited

U.S. PATENT DOCUMENTS

| 1,981,236 | A | | 11/1934 | Logue |
| 5,522,776 | A | * | 6/1996 | Alvey ................ B60K 17/3467 475/221 |
| 6,176,146 | B1 | | 1/2001 | Ore |
| 6,487,484 | B1 | * | 11/2002 | Shober .................... F16H 59/12 701/55 |
| 7,798,937 | B2 | | 9/2010 | Gitt |
| 9,719,563 | B2 | | 8/2017 | Hirao |
| 10,989,288 | B1 | | 4/2021 | Ghatti et al. |
| 11,168,783 | B1 | | 11/2021 | Cradit et al. |
| 11,207,976 | B2 | | 12/2021 | Ghatti et al. |
| 11,209,072 | B2 | | 12/2021 | Ghatti et al. |
| 11,220,176 | B1 | | 1/2022 | Cradit et al. |
| 11,279,342 | B2 | * | 3/2022 | Kawashiri .............. B60K 6/442 |
| 11,441,644 | B2 | | 9/2022 | Ghatti et al. |
| 11,441,657 | B2 | | 9/2022 | Chandrashekar et al. |
| 2011/0111910 | A1 | | 5/2011 | Ideshio et al. |
| 2014/0311266 | A1 | | 10/2014 | Nakashima et al. |
| 2017/0059007 | A1 | | 3/2017 | Eo et al. |
| 2018/0015816 | A1 | | 1/2018 | Robinette et al. |
| 2018/0112770 | A1 | | 4/2018 | Hansson et al. |
| 2019/0054816 | A1 | | 2/2019 | Garcia et al. |
| 2019/0054817 | A1 | | 2/2019 | Garcia et al. |

(Continued)

FOREIGN PATENT DOCUMENTS

WO   WO-2019069344 A1 *  4/2019

OTHER PUBLICATIONS

Keeney et al., U.S. Appl. No. 18/297,782, filed Apr. 10, 2023, 66 pages.

*Primary Examiner* — Roger L Pang
(74) *Attorney, Agent, or Firm* — Brooks Kushman PC

(57) ABSTRACT

A shift control device and method of controlling an axle assembly of a vehicle. The method includes electrically connecting a shift control device to the vehicle and commanding, with the shift control device, an actuator to move a coupling of the axle assembly to a neutral position, thereby disconnecting an electric motor from a wheel hub.

20 Claims, 11 Drawing Sheets

(56) References Cited

U.S. PATENT DOCUMENTS

| | | |
|---|---|---|
| 2019/0054818 A1 | 2/2019 | Garcia et al. |
| 2020/0173494 A1 | 6/2020 | Smith et al. |
| 2020/0173531 A1 | 6/2020 | Smith |
| 2020/0173535 A1 | 6/2020 | Peng et al. |
| 2020/0173537 A1 | 6/2020 | Begov et al. |
| 2020/0173541 A1 | 6/2020 | Soffner et al. |
| 2020/0177049 A1 | 6/2020 | Raya et al. |
| 2020/0177059 A1 | 6/2020 | Smith et al. |
| 2021/0174614 A1* | 6/2021 | Tabata .................... G07C 5/006 |
| 2022/0118854 A1* | 4/2022 | Davis ...................... B60L 50/62 |
| 2022/0316590 A1 | 10/2022 | Chandrashekar et al. |
| 2022/0379892 A1* | 12/2022 | Archer ................ B60W 30/188 |
| 2022/0390009 A1* | 12/2022 | Enot ....................... F16H 61/28 |

* cited by examiner

SHIFT CONTROL DEVICE AND A METHOD OF CONTROLLING AN AXLE ASSEMBLY

TECHNICAL FIELD

This relates to a shift control device and a method of controlling an axle assembly with the shift control device.

BACKGROUND

An axle assembly having a clutch collar is disclosed in U.S. Pat. No. 9,719,563.

SUMMARY

A method of controlling an axle assembly of a vehicle is provided. The method includes electrically connecting a shift control device to the vehicle. The shift control device is external to the vehicle. The method also includes commanding, with the shift control device, an actuator to move a coupling of the axle assembly to a neutral position, thereby disconnecting an electric motor from a wheel hub of the axle assembly. The wheel hub is configured to support a wheel.

The axle assembly may include a differential assembly. The axle assembly may include an axle shaft. The axle shaft may be connected to the wheel hub. The coupling may selectively connect the axle shaft and the differential assembly. The axle shaft may be disconnected from the differential assembly when the coupling is in the neutral position.

The axle assembly may include a differential assembly. The axle assembly may include the electric motor. The electric motor may be disconnected from the differential assembly when the coupling is in the neutral position.

The axle assembly may include a transmission. The transmission may be operatively connected to the electric motor. The axle assembly may include a drive pinion. The drive pinion may be operatively connected to the differential assembly. The coupling may selectively connect the drive pinion to the transmission. The transmission may be disconnected from the drive pinion when the coupling is in the neutral position.

The shift control device may be electrically connected to an external power supply. The device power supply may be external to the vehicle. Electrical energy may be provided from the device power supply to the actuator when commanding the actuator to move the coupling.

Electrically connecting the shift control device to the vehicle may include electrically connecting the shift control device and the device power supply to a controller of a vehicle control system. The vehicle control system may be provided with the vehicle. The controller of the vehicle control system may be electrically connected to the actuator.

The method may include providing a signal indicative of a position of the coupling to the shift control device. The shift control device may have an operator communication device. The operator communication device may communicate a position of the coupling based on the signal. The operator communication device may be activated when the coupling is in the neutral position.

The axle assembly may have a lubricant pump. The method may include operating the lubricant pump when the shift control device is electrically connected to the actuator. The method may include operating the lubricant pump when the coupling is in the neutral position. The lubricant pump may be electrically connected to the external power supply. The device power supply may provide electrical energy to the shift control device.

Electrical connecting the shift control device to the vehicle may include electrically connecting the shift control device to the actuator without electrically connecting the shift control device to the controller of the vehicle control system. Electrically connecting the shift control device to the vehicle may include electrically connecting the device power supply to the actuator.

The method may include towing the vehicle when the coupling is in the neutral position.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
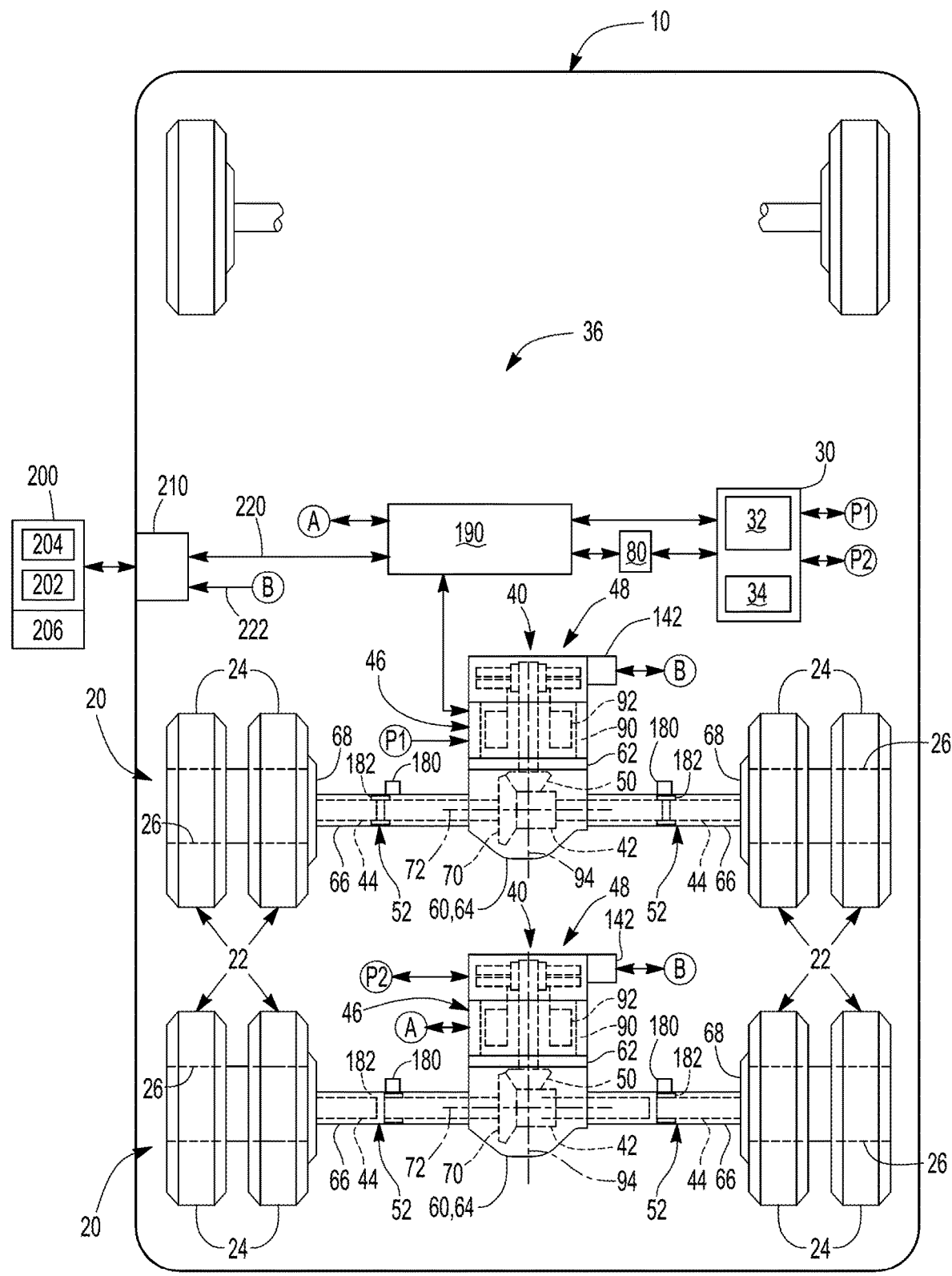
FIG. 1 is a schematic representation of an example of a vehicle that has an axle assembly and an example of a shift control device that is electrically connected to the vehicle.

Referring to FIG. 1, an example of a vehicle 10 is shown. The vehicle 10 may be a motor vehicle like a truck, farm equipment, military transport or weaponry vehicle, or cargo loading equipment for land, air, or marine vessels. The vehicle 10 may include a trailer for transporting cargo in one or more embodiments.

The vehicle 10 includes one or more axle assemblies 20, such as a front axle assembly and a rear axle assembly. The axle assemblies 20 are illustrated as drive axle assemblies. A drive axle assembly is configured to provide torque to one or more wheel assemblies 22 that may be rotatably supported on the axle assembly 20. A wheel assembly 22 may include a tire 24 disposed on a wheel 26. Two axle assemblies 20 are illustrated in FIG. 1; however, it is contemplated that a greater or lesser number of axle assemblies may be provided.

The vehicle 10 includes an electric energy system 30 that includes a first electric power source 32 and a second electric power source 34. The vehicle 10 also includes a control system 36.

In some configurations, an axle assembly 20 includes a housing assembly 40, a differential assembly 42, a pair of axle shafts 44, an electric motor 46, a transmission 48, and a drive pinion 50. In some configurations, the axle assembly 20 includes one or more wheel disconnects 52. The positioning of the differential assembly 42, the electric motor 46, and/or the transmission 48 may differ from that shown. For instance, the differential assembly 42 may be positioned between the electric motor 46 and the transmission 48. It is also contemplated that the electric motor 46, the transmission 48, or both may be remotely positioned from the axle assembly 20 and may not be part of the axle assembly 20. For illustration purposes, the axle assembly 20 will be primarily described in the context of the configuration shown in FIGS. 1 and 2.

Referring to FIG. 1, the housing assembly 40 receives various components of the axle assembly 20. In addition, the housing assembly 40 may facilitate mounting of the axle assembly 20 to the vehicle 10. In some configurations, the housing assembly 40 may include an axle housing 60 and a differential carrier 62.

The axle housing 60 may receive and support the axle shafts 44. In some configurations, the axle housing 60 may include a center portion 64 and at least one arm portion 66.

The center portion 64 may be disposed proximate the center of the axle housing 60. The center portion 64 may define a cavity that may receive the differential assembly 42.

One or more arm portions 66 may extend from the center portion 64. For example, two arm portions 66 may extend in opposite directions from the center portion 64 and away from the differential assembly 42. The arm portions 66 may each have a hollow configuration or tubular configuration that may extend around and may receive a corresponding axle shaft 44 and may help separate or isolate the axle shaft 44 from the surrounding environment. A wheel hub 68 may be rotatably disposed on an arm portion 66 and may be connected to an axle shaft 44. A wheel assembly 22 is mountable to the wheel hub 68.

The differential carrier 62 may be mounted to the center portion 64 of the axle housing 60. The differential assembly 42 may be rotatably supported on the differential carrier 62.

The differential assembly 42 is disposed in the housing assembly 40. For instance, the differential assembly 42 may be disposed in the center portion 64 of the axle housing 60. The differential assembly 42, which may also be called an axle differential, may transmit torque to the axle shafts 44 of the axle assembly 20 and permit the axle shafts 44 and wheel assemblies 22 to rotate at different velocities in a manner known by those skilled in the art. For example, the differential assembly 42 may have a ring gear 70 that may be fixedly mounted on a differential case. The ring gear 70 and the differential case may be rotatable about a differential axis 72. The differential case may receive differential gears that may be operatively connected to the axle shafts 44.

The axle shafts 44 are configured to transmit torque between the differential assembly 42 and a corresponding wheel hub 68. For example, two axle shafts 44 may be provided such that each axle shaft 44 extends through a different arm portion 66 of axle housing 60. The axle shafts 44 may be rotatable about an axis, such as the differential axis 72 or a wheel axis. The wheel axis may be the same as the differential axis 72 or may differ from the differential axis 72.

The electric motor 46 is configured to provide torque, such as propulsion torque or regenerative braking torque. Propulsion torque may be used to propel the vehicle 10, such as in a forward or backward direction. Propulsion torque may also be used to hold the vehicle 10 in a stationary position or to help reduce, limit, or prevent vehicle rollback, such as when the vehicle 10 is on an inclined surface. Regenerative braking may provide a regenerative braking torque. Regenerative braking may capture kinetic energy when the electric motor 46 is used to brake or slow the velocity of the vehicle 10. Recovered energy may be transmitted from the wheel assemblies 22 to drive the electric motor 46. Thus, the electric motor 46 may function as a generator and may be used to charge the first electric power source 32, the second electric power source 34, or both. The electric motor 46 may be electrically connected to the electric energy system 30 via an inverter 80 in a manner known by those skilled in the art.

Examples of electrical connections between the front axle assembly 20 and the electric energy system 30 and between the rear axle assembly 20 and the electric energy system 30 are represented with connection symbols P1 and P2, respectively. In some configurations, the electric energy system 30 is electrically connected to both axle assemblies 20. In other configurations each axle assembly 20 may be electrically connected to a different electric energy system 30 or different electric power sources. For instance, a first energy storage system may be electrically connected to a first axle assembly but not to a second axle assembly while a second energy storage system may be electrically connected to the second axle assembly but not to the first axle assembly.

The electric motor 46 includes a stator 90 and a rotor 92. The stator 90 may be fixedly positioned with respect to the housing assembly 40. The stator 90 may encircle the rotor 92. The rotor 92 is rotatable about an axis 94 with respect to the stator 90. The electric motor 46 may be mounted to or positioned inside of the housing assembly 40.

The transmission 48 facilitates the transmission of torque between the electric motor 46 and the drive pinion 50. Torque transmission may be bidirectional. The transmission 48 may provide gear reduction and multiple gear ratios between the rotor 92 and the drive pinion 50. The transmission 48 may be of any suitable type. For instance, the transmission 48 may be a countershaft transmission, an epicyclic transmission (e.g., a transmission having a planetary gear set), or the like. A countershaft transmission may include a single countershaft or multiple countershafts. Examples of an axle assembly having a single countershaft transmission are disclosed in U.S. Pat. Nos. 11,002,352 and 11,209,072. Examples of an axle assembly having a dual countershaft transmission is disclosed in in U.S. Pat. Nos. 10,989,288, 11,207,976, and 11,220,176. Examples of an axle assembly having an epicyclic transmission are disclosed in U.S. Pat. Nos. 11,038,396 and 11,428,297. The disclosures of the references in the preceding three sentences are hereby incorporated in their entirety by reference herein.

Figure 3:
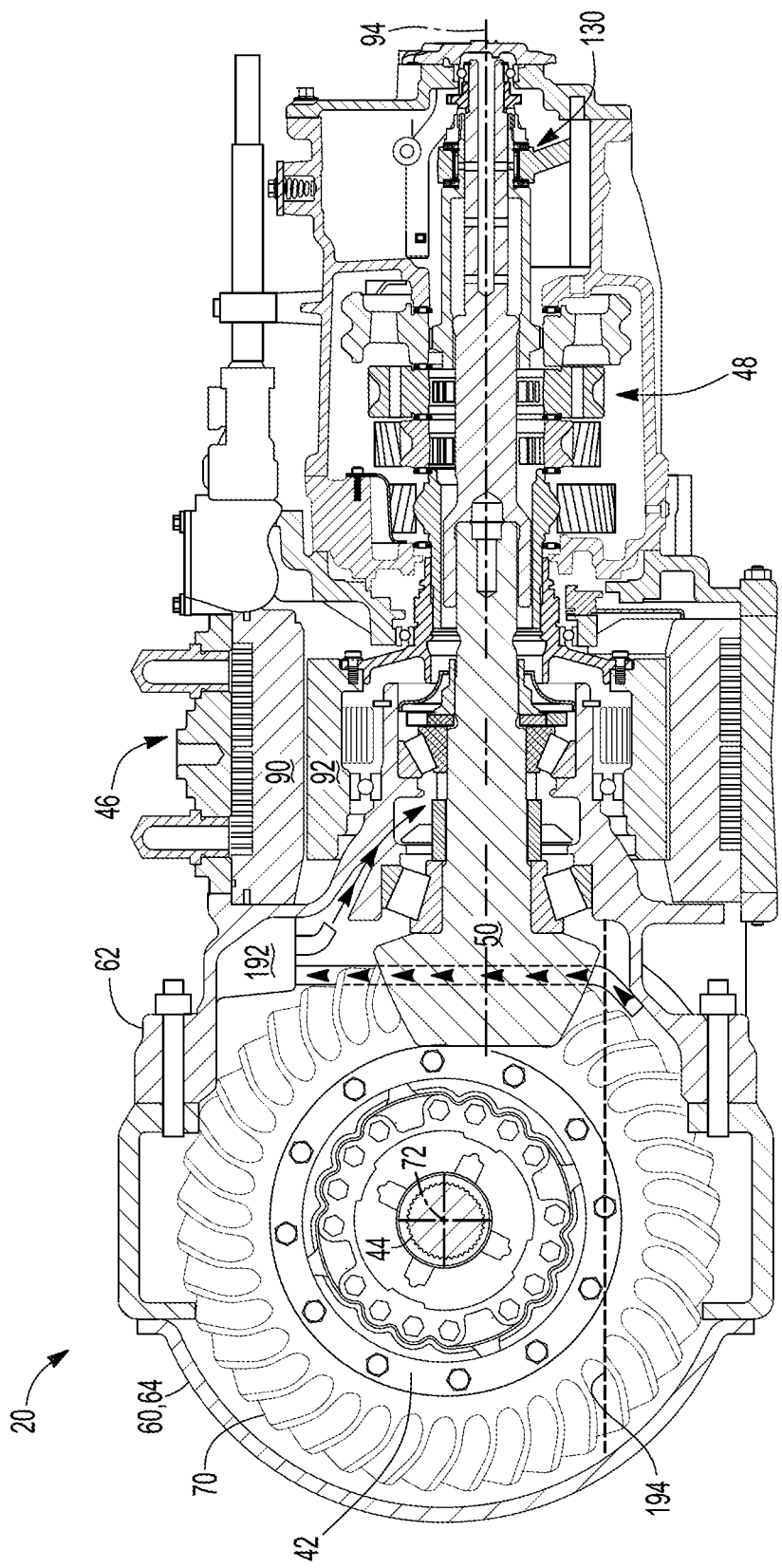
FIG. 3 is a section view of the axle assembly along section line 3-3.
Figure 4:
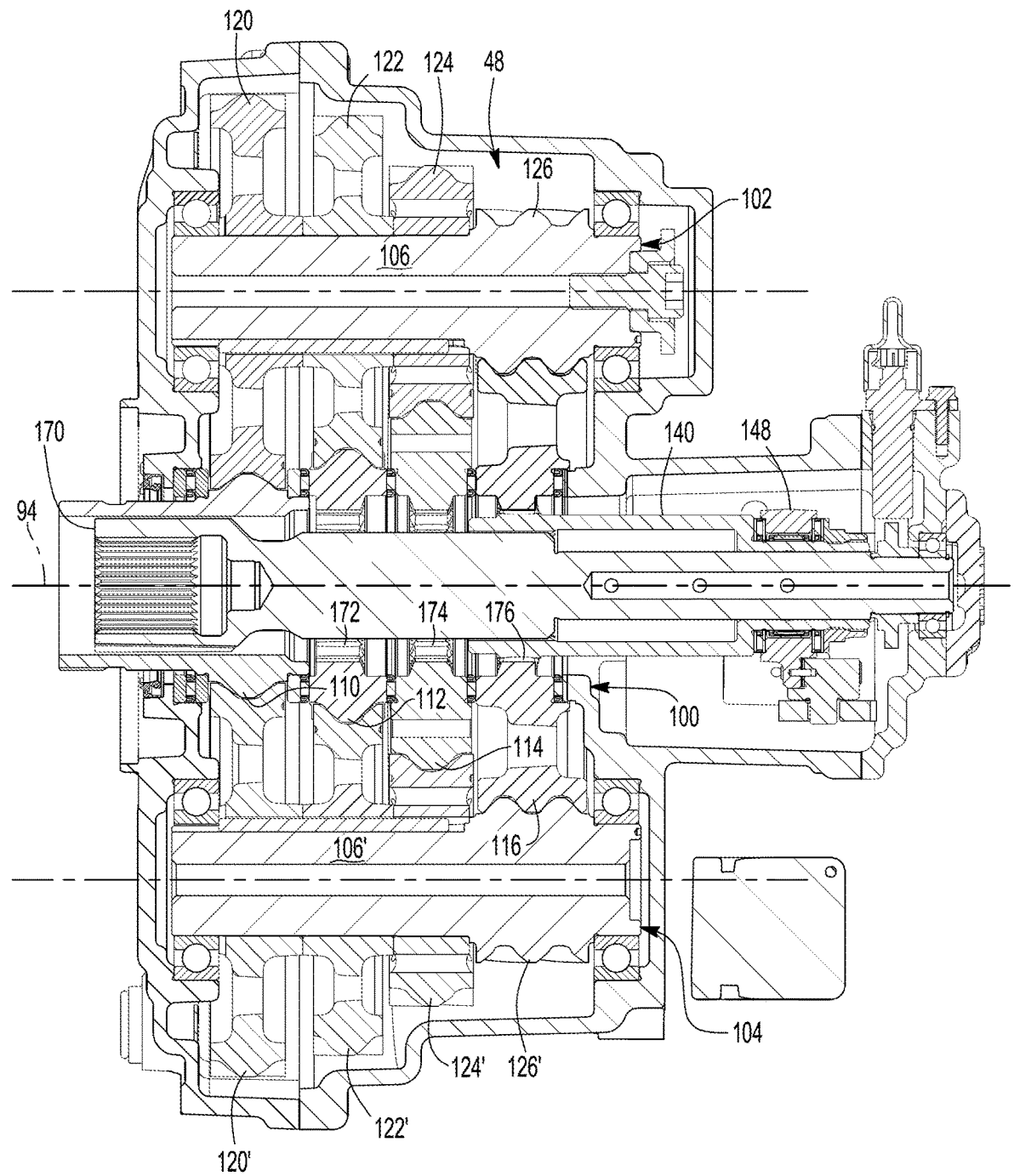
FIG. 4 is a section view of the axle assembly along section line 4-4.

An example of a transmission 48 that is configured as a countershaft transmission is shown in FIGS. 3 and 4. As is best shown in FIG. 4, the transmission 48 may include a set of drive pinion gears 100, a first countershaft gear set 102, and optionally a second countershaft gear set 104. Gears of the first and second countershaft gear sets 102, 104 may be disposed on and rotatable with first and second countershafts 106, 106', respectively.

The set of drive pinion gears 100 may include a plurality of gears, some or all of which may be selectively coupled to the drive pinion 50. The gears may be independently rotatable with respect to each other. In the configuration shown, the set of drive pinion gears 100 includes a first gear 110, a second gear 112, a third gear 114, and a fourth gear 116; however, it is to be understood that a greater or lesser number of gears may be provided. The first gear 110 may mesh with one or more first countershaft gears 120, 120'. The second gear 112 may mesh with one or more second countershaft gears 122, 122'. The third gear 114 may mesh with one or more third countershaft gears 124, 124'. The fourth gear 116 may mesh with one or more fourth countershaft gears 126, 126'.

Figure 5:
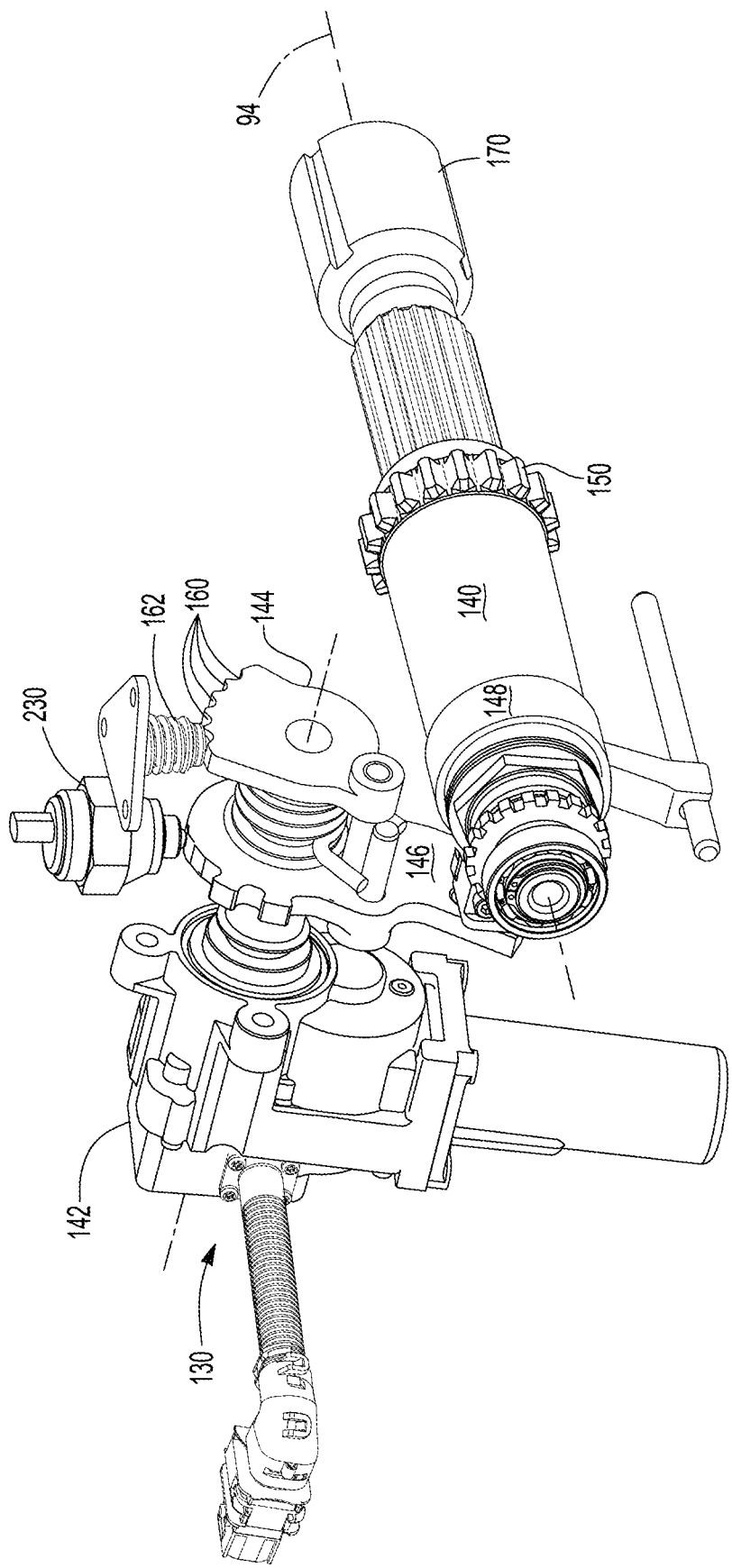
FIG. 5 is a perspective view of an example of a shift mechanism that may be provided with the axle assembly.

Referring primarily to FIG. 5, an example of a shift mechanism 130 is shown. The shift mechanism 130 is configured to selectively connect a member of the set of drive pinion gears 100 to the drive pinion 50. The shift mechanism 130 may couple one member of the set of drive pinion gears 100 at a time to the drive pinion 50. The member of the set of drive pinion gears 100 that is coupled to the drive pinion 50 may be rotatable about the axis 94 with the drive pinion 50.

The shift mechanism 130 may have any suitable configuration. In at least one configuration such as is shown in FIG. 5, the shift mechanism 130 may include a coupling 140, an actuator 142, a detent linkage 144, a linkage 146, and a collar 148.

The coupling 140 is rotatable about the axis 94 with the drive pinion 50. In addition, the coupling 140 may be moveable along the axis 94 with respect to the drive pinion 50. The coupling 140 may selectively connect a member of the set of drive pinion gears 100 to the drive pinion 50 as will be discussed in more detail below. In at least one configuration, the coupling 140 may include a coupling gear 150 that is engageable with different members of the set of drive pinion gears 100.

The actuator 142 is configured to move the coupling 140 along the axis 94 between a plurality of positions to selectively couple the coupling 140 to the transmission 48 or to decouple the coupling 140 from the transmission 48 as will be discussed in more detail below.

The detent linkage 144 is coupled to the actuator 142. For instance, the detent linkage 144 may be fixedly coupled to an actuator shaft of the actuator 142. The detent linkage 144 may define a plurality of recesses 160. The recesses 160 may be configured to receive a detent feature 162. The detent feature 162 may inhibit rotation of the detent linkage 144.

The linkage 146, if provided, may operatively connect the detent linkage 144 to the collar 148.

The collar 148 may receive the coupling 140. The coupling 140 may be rotatably disposed in the collar 148 such that the coupling 140 may rotate about the axis 94 with respect to the collar 148.

The coupling 140 is moveable between at least one neutral position and one or more torque transmitting positions. The coupling 140 may selectively connect the drive pinion 50 to the transmission 48 when in a torque transmitting position. More specifically, the coupling 140 may selectively connect the drive pinion 50 to a member of the set of drive pinion gears 100. In the discussion below, reference to connecting or disconnecting a member of the set of drive pinion gears 100 to/from the drive pinion 50 includes direct and indirect connections to and disconnections from the drive pinion 50. For instance, a member of the set of drive pinion gears 100 may be directly coupled to the drive pinion 50 or indirectly connected to the drive pinion 50 such as via a drive pinion extension 170. The drive pinion extension 170 may extend from the drive pinion 50. For instance, the drive pinion extension 170 may be attached to the drive pinion 50 and may lengthen the drive pinion 50.

Figure 6:
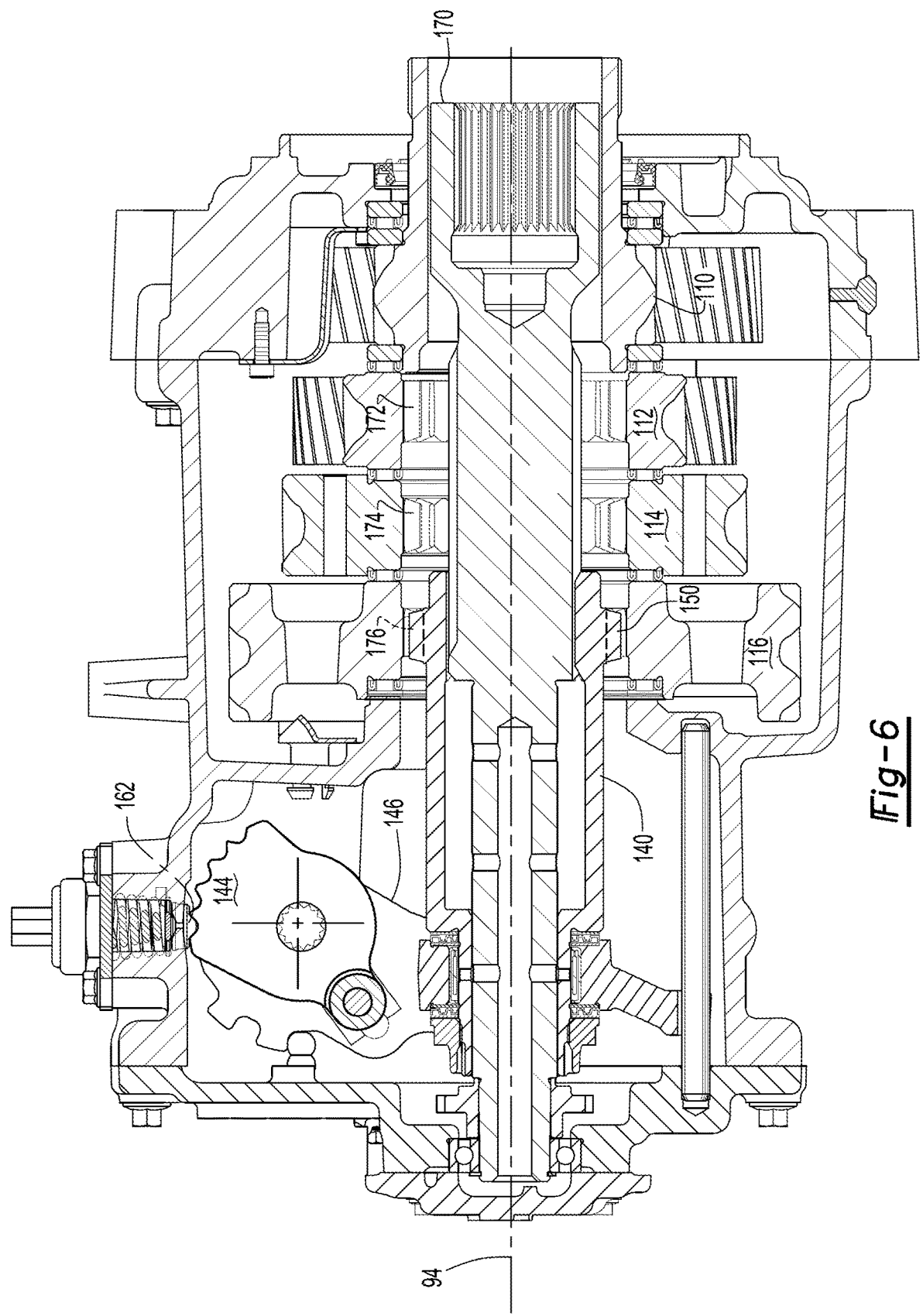
FIG. 6 is a section view of a portion of the axle assembly along section line 6-6 showing in example of a coupling in a first position.

The coupling 140 is in a first position in FIG. 6. In the first position, the coupling 140 may couple the fourth gear 116 to the drive pinion 50. For example, the teeth of the coupling gear 150 may mesh with inner gear teeth 176 of the fourth gear 116. Torque may be transmitted from the rotor 92 to the first gear 110, from the first gear 110 to the first countershaft gears 120, 120', from the first countershaft gears 120, 120' to the fourth countershaft gears 126, 126' via the first and second countershafts 106, 106', respectively, from the fourth countershaft gears 126, 126' to the fourth gear 116, and from the fourth gear 116 to the drive pinion 50 via the coupling gear 150 of the coupling 140.

Figure 7:
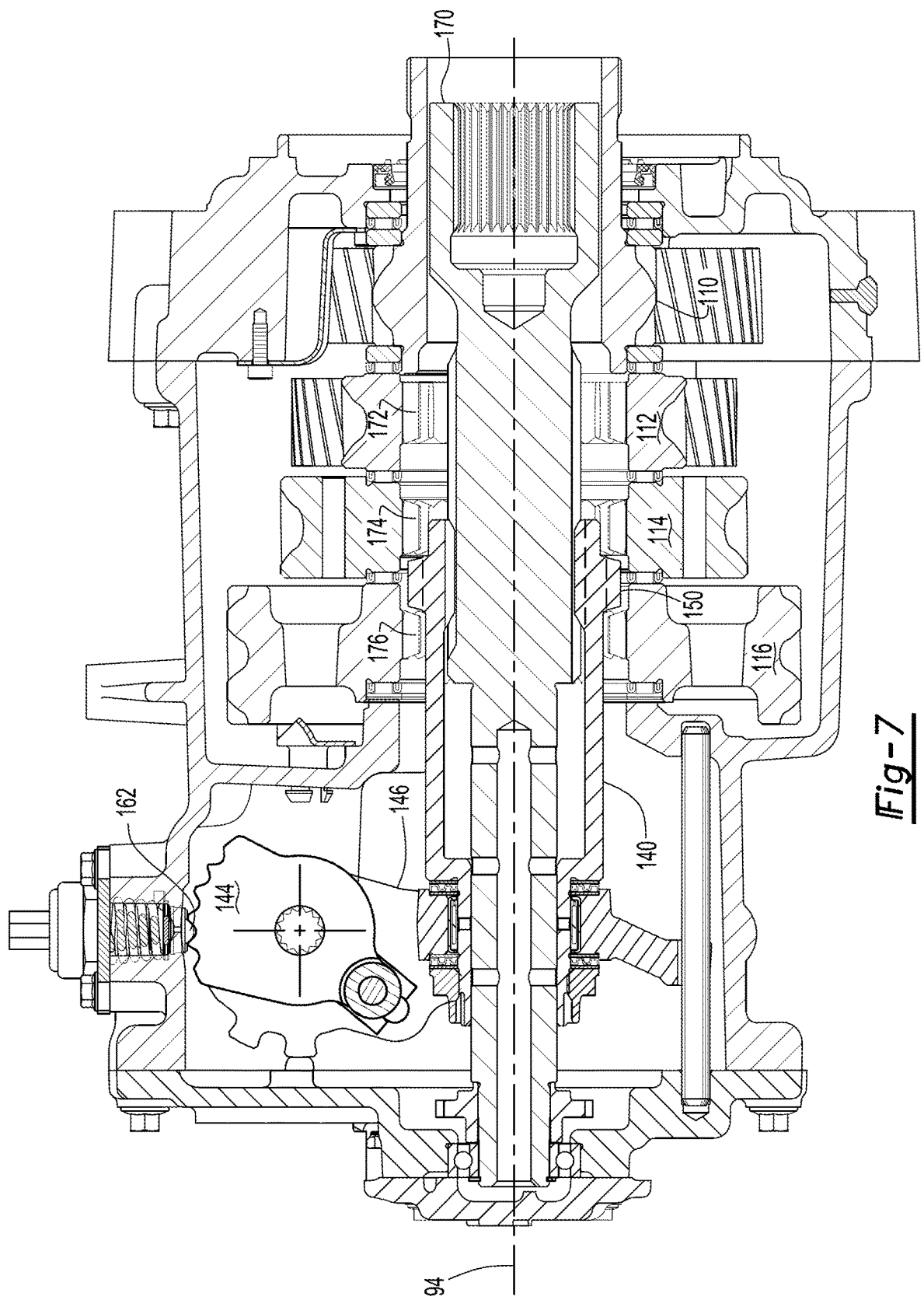
FIG. 7 is a section view of a portion of the axle assembly in FIG. 6 with the coupling in a first neutral position.

The coupling 140 is in a first neutral position in FIG. 7. In the first neutral position, the coupling 140 may not couple any member of the set of drive pinion gears 100 to the drive pinion 50. As such, the teeth of the coupling gear 150 may be spaced apart from the first gear 110, the second gear 112, the third gear 114, and the fourth gear 116. Torque may not be transmitted between the transmission 48 and the drive pinion 50 in the first neutral position. Thus, the transmission 48 is disconnected from the drive pinion 50 when the coupling is in the first neutral position. The electric motor 46 and the transmission 48 are disconnected from the differential assembly 42 and the axle shafts 44 when the coupling 140 is in the first neutral position.

Figure 8:
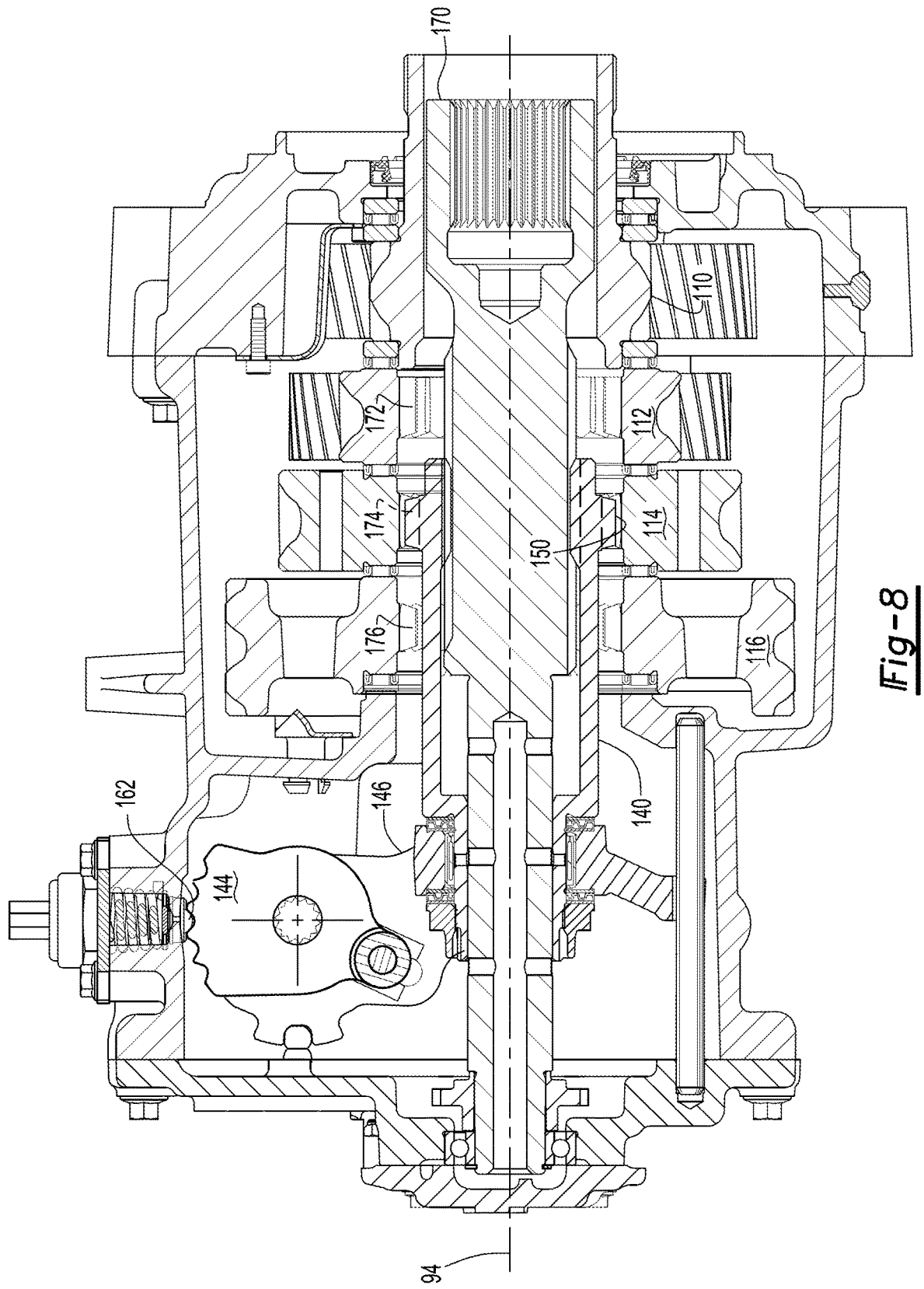
FIG. 8 is a section view of a portion of the axle assembly in FIG. 6 with the coupling in a second position.

The coupling 140 is in a second position in FIG. 8. In the second position, the coupling 140 may couple the third gear 114 to the drive pinion 50. For example, the teeth of the coupling gear 150 may mesh with inner gear teeth 174 of the third gear 114. Torque may be transmitted from the rotor 92 to the first gear 110, from the first gear 110 to the first countershaft gears 120, 120', from the first countershaft gears 120, 120' to the third countershaft gears 124, 124' via the first and second countershafts 106, 106', respectively, from the third countershaft gears 124, 124' to the third gear 114, and from the third gear 114 to the drive pinion 50 via the coupling gear 150 of the coupling 140.

Figure 9:
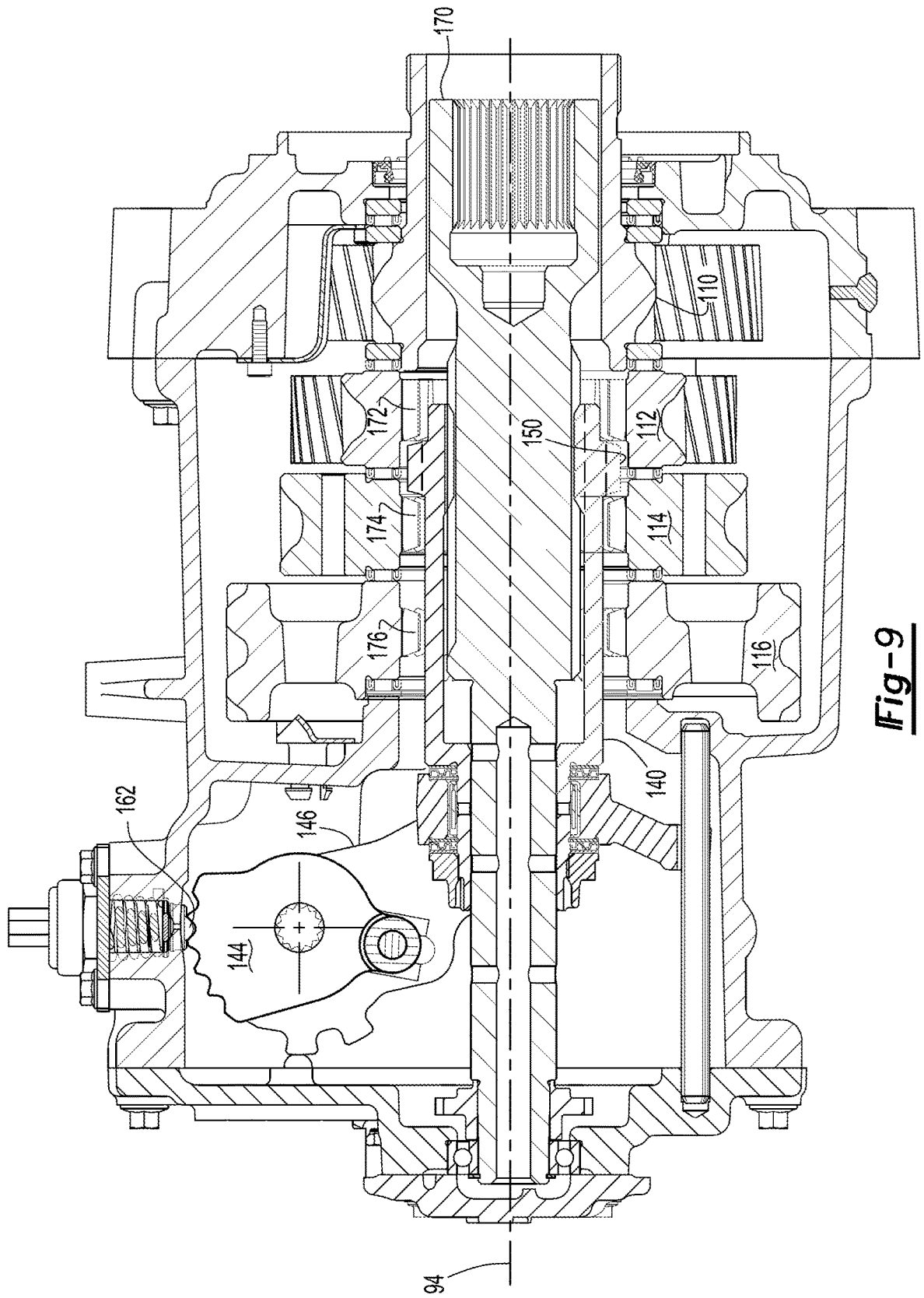
FIG. 9 is a section view of a portion of the axle assembly in FIG. 6 with the coupling in a second neutral position.

The coupling 140 is in a second neutral position in FIG. 9. In the second neutral position, the coupling 140 may not couple any member of the set of drive pinion gears 100 to the drive pinion 50. As such, the teeth of the coupling gear 150 may be spaced apart from the first gear 110, the second gear 112, the third gear 114, and the fourth gear 116. Torque may not be transmitted between the transmission 48 and the drive pinion 50 in the second neutral position. Thus, the transmission 48 is disconnected from the drive pinion 50 when the coupling is in the second neutral position. The electric motor 46 and the transmission 48 are disconnected from the differential assembly 42 and the axle shafts 44 when the coupling 140 is in the second neutral position.

Figure 10:
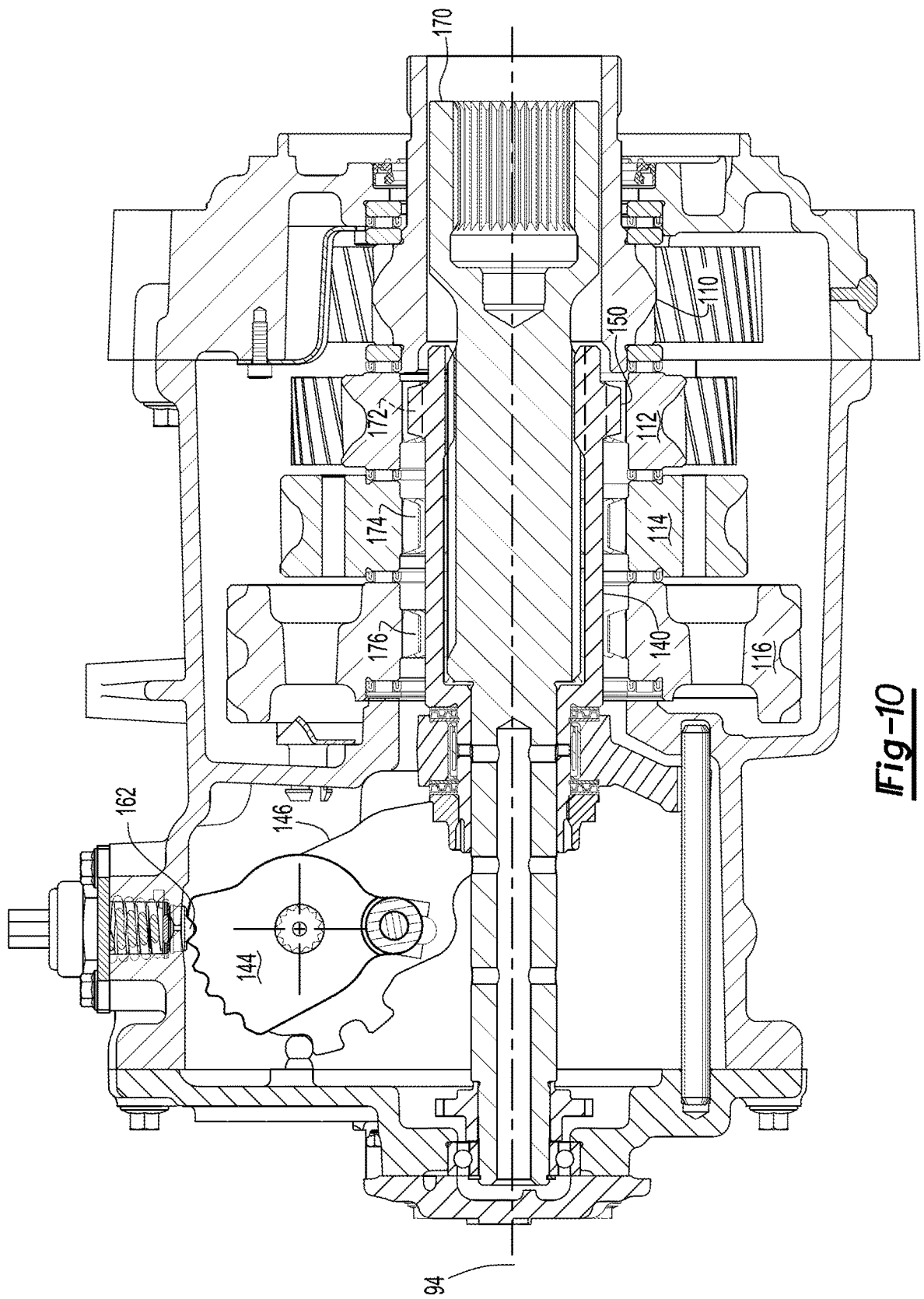
FIG. 10 is a section view of a portion of the axle assembly in FIG. 6 with the coupling in a third position.

The coupling 140 is in a third position in FIG. 10. In the third position, the coupling 140 may couple the second gear 112 to the drive pinion 50. For example, the teeth of the coupling gear 150 may mesh with inner gear teeth 172 of the second gear 112. Torque may be transmitted from the rotor 92 to the first gear 110, from the first gear 110 to the first countershaft gears 120, 120', from the first countershaft gears 120, 120' to the second countershaft gears 122, 122' via the first and second countershafts 106, 106', respectively, from the second countershaft gears 122, 122' to the second gear 112, and from the second gear 112 to the drive pinion 50 via the coupling gear 150 of the coupling 140.

The drive pinion 50 operatively connects the differential assembly 42 and the transmission 48. The drive pinion 50 may be received in the housing assembly 40 and may transmit torque between the differential assembly 42 and the transmission 48. The drive pinion 50 may be rotatable about an axis, such as the axis 94, and may have a gear portion that has teeth that meshes with teeth of the ring gear 70 of the differential assembly 42. Torque that is provided by the electric motor 46 to the transmission 48 and to the drive pinion 50 may be transmitted to the ring gear 70 and thus to the differential assembly 42.

Referring to FIG. 1, the wheel disconnect 52, if provided, is configured to couple the differential assembly 42 to a wheel hub 68 and decouple the differential assembly 42 from the wheel hub 68. In some embodiments, the wheel disconnect 52 includes an actuator 180 and a coupling 182. The actuator 180 is configured to actuate or move the coupling 182 between a coupled position and a decoupled position, which is also referred to as a neutral position. In the coupled position, the differential assembly 42 may be directly or indirectly coupled to the wheel hub 68 via the coupling 182 to permit torque to be transferred between the differential assembly 42 and the wheel hub 68. In the decoupled or neutral position, the differential assembly 42 may be decoupled or disconnected from the wheel hub 68 such that torque is not transferrable between the differential assembly 42 and the wheel hub 68. For illustration purposes, the wheel disconnects associated with the front axle assembly 20 are shown in the coupled position while the wheel disconnects 52 associated with the rear axle assembly 20 are shown in the neutral position in FIG. 1.

The coupling 182 may be located at any suitable location. In the example shown, the coupling 182 is positioned between the differential assembly 42 and the wheel hub 68 such that the coupling 182 can couple/decouple a stub shaft of the differential assembly 42 and an axle shaft 44. As such, the stub shaft and the axle shaft 44 may be rotatable together when the coupling 182 is in the coupled position and the axle shaft 44 can rotate with respect to the stub shaft when the coupling 182 is in the neutral position. In such a configuration, torque may not be transferred between the differential assembly 42 and the axle shaft 44 when the coupling 182 is in the neutral position.

As another example, the coupling 182 may also be positioned closer to the wheel hub 68, such as between the wheel hub 68 and the axle shaft 44. The wheel hub 68 and the axle shaft 44 may be rotatable together when the coupling 182 is in the coupled position and the axle shaft 44 can rotate with respect to the wheel hub 68 when the coupling 182 is in the neutral position. In such a configuration, torque may not be transferred between the wheel hub 68 and the axle shaft 44 when the coupling 182 is in the neutral position.

Regardless of where the coupling 182 is located, moving the coupling to the neutral position not only disconnects the wheel hub 68 from the differential assembly 42, but also disconnects the electric motor 46 and the transmission 48 from the wheel hub 68. Thus, rotation of the wheel hub 68 does not cause rotation of the differential assembly 42, the electric motor 46 and the transmission 48.

The electric energy system 30 is disposed on the vehicle 10. The electric energy system 30 is configured to store and supply electrical energy. Electrical energy may be stored in the first electric power source 32 and the second electric power source 34. Electrical energy may be provided to the electric energy system 30 to charge the first electric power source 32, the second electric power source 34, or both. For example, electrical energy may be provided to the electric energy system 30 when the electric motor 46 is operating as a generator.

The first electric power source 32 is configured to provide electrical energy to propel the vehicle 10. The first electric power source 32, which may also be referred to as a traction battery or an energy storage system (ESS), may be a high-voltage power source that may include a plurality of electrical energy storage devices, such as battery cells, capacitors, or the like. The first electric power source 32 may have a higher storage capacity than the second electric power source 34.

The second electric power source 34 is configured to provide electrical energy for non-propulsion functions. Examples of non-propulsion functions may include vehicle startup, vehicle systems monitoring, vehicle access, lighting, audio system, and the like. The second electric power source 34, which may be referred to as a low-voltage power source or low-voltage battery, may be a low-voltage power source that may have a lower voltage capacity or provide a lower voltage of electrical energy than the first electric power source 32. As a nonlimiting example, the second electric power source 34 may be a battery, including but not limited to a nominally rated 12V battery. The second electric power source 34 may be electrically connectable to the first electric power source 32 via a DC/DC connection.

Figure 2:
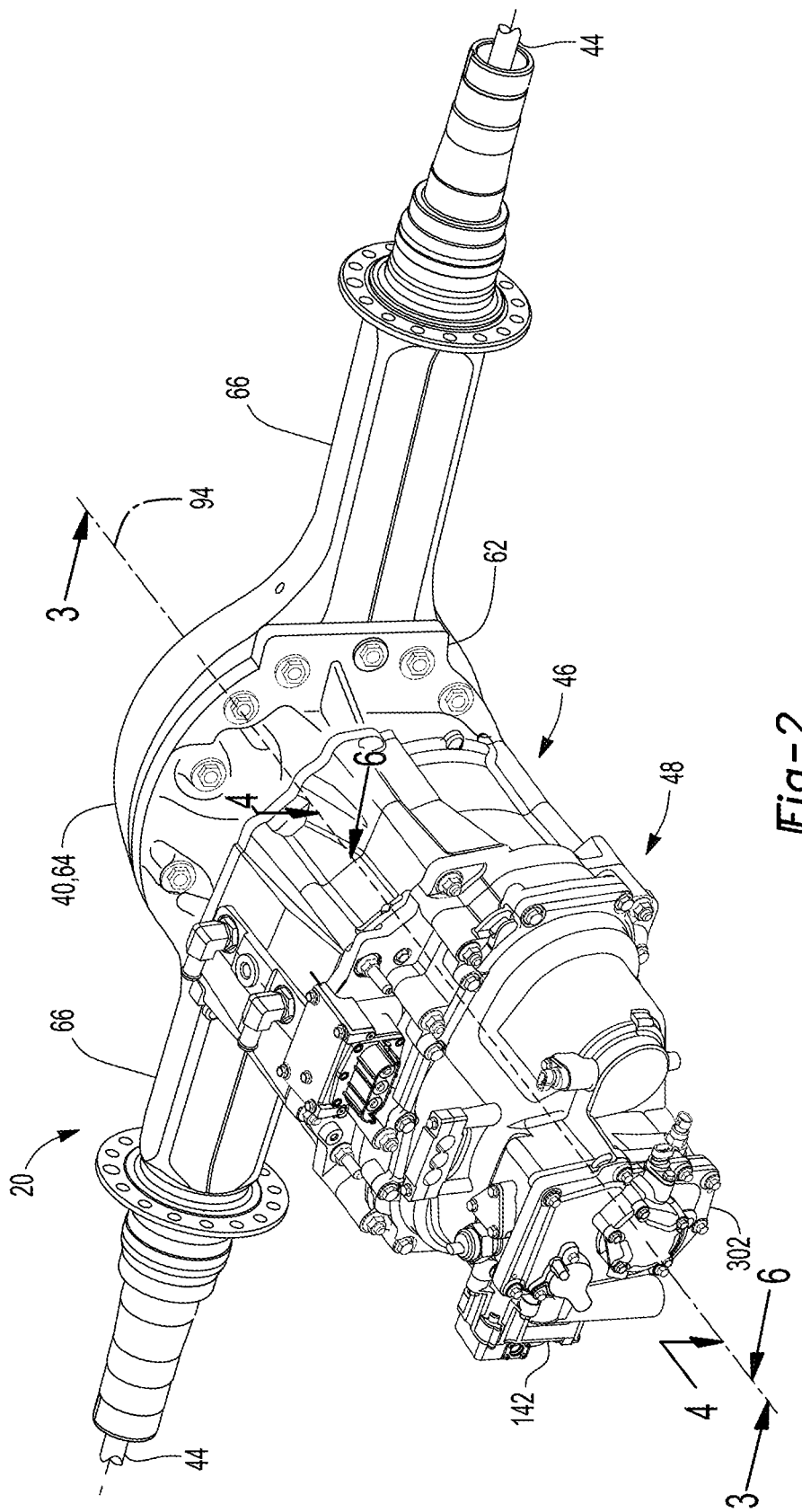
FIG. 2 is a perspective view of an example of the axle assembly.

The control system 36 is provided with the vehicle 10. The control system 36 controls operation of one or more axle assemblies 20. For example, the control system 36 may include one or more microprocessor-based control modules or controllers 190 that may be electrically connected to or communicate with components of the vehicle 10 and/or the axle assembly 20, such as the electric motor 46, the inverter 80, the actuator 180, etc. The control system 36 may optionally control operation of a lubricant pump 192 that may be provided with an axle assembly 20. The lubricant pump 192 may be an electric lubricant pump that has an electric motor. The lubricant pump 192 is configured to pump lubricant 194 from a sump portion or reservoir of the axle assembly 20 such as is shown in FIG. 2, to lubricate rotatable components like gears and bearings that are remotely positioned from the sump portion or that do not receive sufficient lubrication when lubricant 194 is splashed from the sump portion.

Control system connections are represented by the double arrowed lines associated with the controller 190 in FIG. 1 as well as by connection symbol A. Control system connections may represent electrical connections for communication and control, electrical connections to provide power, or both. The control system 36 may also monitor and control the electric energy system 30. In addition, the control system 36 may also be electrically connectable to a shift control device 200.

The shift control device 200 is connectable to the vehicle 10. For instance, the shift control device 200 may be external to the vehicle 10 and may be connected to the vehicle 10 to provide external control of the control system 36 or to bypass the control system 36. As used herein, external to the vehicle includes a shift control device that is connectable to the vehicle 10 but may not be part of the vehicle 10 when the vehicle 10 is originally manufactured. The shift control device 200 can be physically located outside the vehicle 10, but the term external to the vehicle is not intended to require that the shift control device 200 be located outside of the vehicle 10 when in use. For instance, the shift control device 200 may be disposed on or disposed inside the vehicle 10 when electrically connected to the vehicle. In at least one configuration, the shift control device 200 includes a device controller 202, and operator communication device 204. The shift control device 200 may include a device power supply 206 or may be electrically connected to a device power supply 206.

The device controller 202 may include one or more microprocessor-based controllers that may control operation of the shift control device 200. The device controller 202 may be electrically connected to the device power supply 206 and may be powered by the device power supply 206. The device controller 202 may control operation of the operator communication device 204 and may be connectable to the vehicle 10 to control operation of a coupling as will be discussed in more detail below.

The device power supply 206 provides power or electrical energy to the shift control device 200 and may provide limited power to the vehicle 10 to power an actuator 142, 180 that is configured to move a coupling 140, 182. The device power supply may be of any suitable type. In some embodiments, the device power supply may be a battery such as a DC battery like a 12 V battery. The device power supply 206 differs from a device power supply that may facilitate charging of the electric energy system 30, such as a Level 1 (120 V) charger, Level 2 (240 V) charger, Direct Current (DC) fast charger, or the like.

The operator communication device 204 facilitates communication with an operator. The operator communication device 204 may be of any suitable type. For instance, the operator communication device 204 may provide visual communication, such as a display, light, screen, touchpad or the like, may provide audible communication such as a sound or spoken language message. It is also contemplated that the operator communication device 204 may provide haptic feedback such as vibration that may be felt by an operator. The operator communication device 204 may be used to communicate the position of the coupling 140, 182, such as whether the coupling 140, 182 is in the neutral position.

Figure 11:
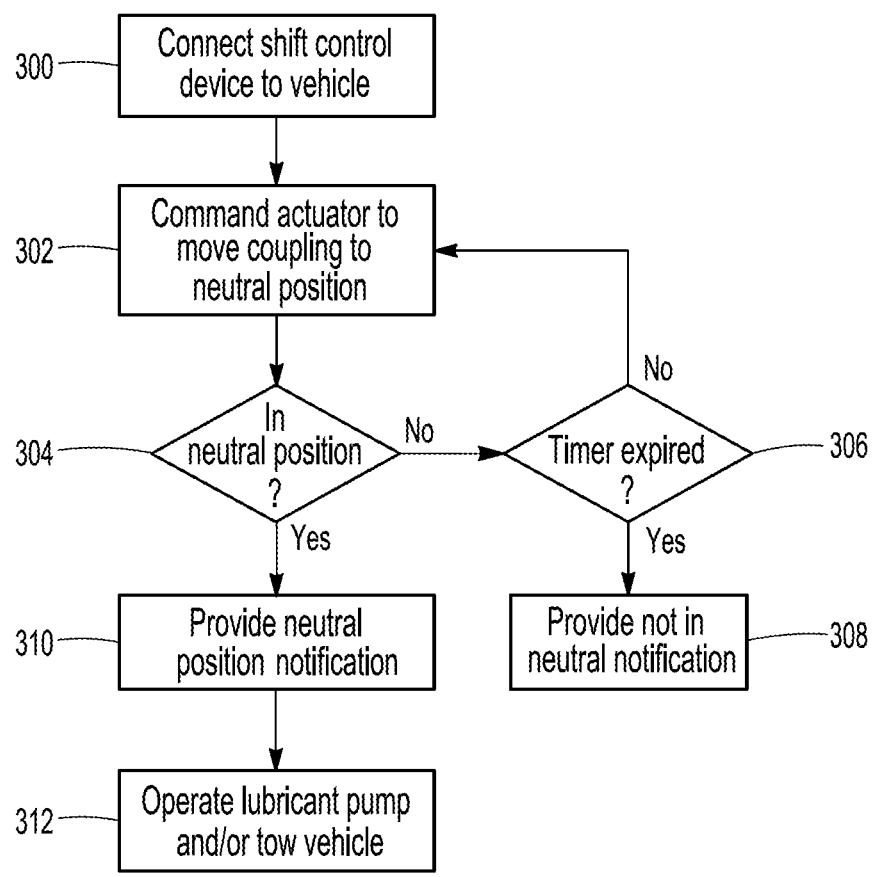
FIG. 11 is a flowchart of a method of controlling the axle assembly with the shift control device.

Referring to FIG. 11, a flowchart associated with a method of controlling an axle assembly or a vehicle having an axle assembly is shown. As will be appreciated by one of ordinary skill in the art, the flowcharts may represent control logic which may be implemented or affected in hardware, software, or a combination of hardware and software. For example, the various functions may be affected by a programmed microprocessor, such as may be provided with the shift control device 200. The control logic may be implemented using any of a number of known programming and processing techniques or strategies and is not limited to the order or sequence illustrated. For instance, interrupt or event-driven processing may be employed in real-time control applications rather than a purely sequential strategy as illustrated. Likewise, parallel processing, multitasking, or multi-threaded systems and methods may be used.

Control logic may be independent of the particular programming language, operating system, processor, or circuitry used to develop and/or implement the control logic illustrated. Likewise, depending upon the particular programming language and processing strategy, various functions may be performed in the sequence illustrated, at substantially the same time, or in a different sequence while accomplishing the method of control. The illustrated functions may be modified, or in some cases omitted, without departing from the scope of the present invention. Method steps may be executed by the shift control device 200 or the shift control device in conjunction with the control system 36. Method steps may be implemented as a closed loop control system.

As an overview, an electric vehicle or vehicle that has an axle assembly that employs an electric motor for propulsion rather than an internal combustion engine may need to be towed or otherwise placed in a state where the vehicle can be moved but not under its own power. This is facilitated by disconnecting the vehicle wheels from the upstream components, such as the differential assembly, transmission, electric motor, or combinations thereof. The wheels can be disconnected from such components when a coupling of a wheel end disconnect or a coupling that is associated with the transmission is in a neutral position. Movement of the coupling to a neutral position may be controlled by the vehicle control system. However, if the vehicle control system is inoperative or cannot be powered by the electric energy system of the vehicle, then the shift control device may be used to move a coupling to a neutral position.

The coupling that can be moved to the neutral position can be the coupling 140 associated with the transmission 48, a coupling 182 associated with the wheel disconnect 52, or any other coupling disposed between the wheel hub 68 and the rotor 92 of the electric motor 46. The shift control device 200 will primarily be discussed below in conjunction with a coupling that is coupling 140, coupling 182, or both. Reference to "coupling 140, 182" is used to refer to at least one coupling and is not intended to require that both couplings be controlled or moved. Similarly, reference to "actuator 142, 180" is used to refer to an actuator that is associated with the coupling being controlled or moved and is not intended to require that both actuators be controlled or operated. The couplings 140, 182 may be of any suitable type, such as a clutch or collar. Some examples include a friction clutch, wet clutch, dry clutch, plate clutch, cone clutch, centrifugal clutch, dog clutch, spline clutch, hydraulic clutch, electromagnetic clutch, vacuum clutch, or the like.

The method will be described in the context of the shift control device 200 initially being electrically disconnected from the vehicle 10. In addition, the method is described in the context of the vehicle 10 being in a state where the vehicle may be unable to propel itself under its own power, such as when a system fault exists that disables vehicle propulsion using power from the electric energy system 30 of the vehicle 10.

At block 300, the shift control device 200 is electrically connected to the vehicle 10. The shift control device 200 may be electrically connected to the vehicle 10 with a cable or other electrical conductor. Connecting the shift control device 200 to the vehicle 10 may also include electrical connecting the device power supply 206 to the vehicle 10.

The shift control device 200 may be electrically connected to the vehicle 10 in various ways.

In some configurations, the shift control device 200 may be electrically connected to the vehicle 10 and the vehicle control system 36 via a connection interface 210, such as a plug. The shift control device 200 may be powered by the device power supply 206 when the shift control device 200 is electrically connected to the vehicle 10. In addition, the device power supply 206 may be electrically connected to a controller 190 of the vehicle control system 36. Such a configuration is represented by the connection line 220 between the controller 190 and connection interface 210 and not connection line 222. For instance, the shift control device 200 may provide electrical energy from the device power supply 206 to power one or more controllers 190 of the control system 36, such as when sufficient electrical energy is not available or cannot be provided by the electric energy system 30 that is disposed on the vehicle 10. In such a configuration, electrically connecting the shift control device 200 to the vehicle 10 may permit the shift control device 200 to communicate with the vehicle control system 36 and one or more controllers 190. In turn, the controller 190 may be electrically connected to the actuator 142, 180.

In another configuration, the shift control device 200 may be electrically connected to the vehicle 10 in a manner that bypasses the control system 36. For example, the shift control device 200 may be electrically connected to an actuator 142, 180 without electrically connecting the shift control device 200 to the controller 190. Such a configuration is represented by connection line 222 instead of connection line 220. In such a configuration, the shift control device 200 and the device power supply 206 may be electrically connected to an actuator 142, 180 in a manner that bypasses or and does not provide power to a controller 190. As an example, the actuator 142, 180 may have a wire harness that has an electrical connector that is connectable with a wire harness of the control system 36. The wire harness that extends from the actuator 142, 180 may be unplugged from the wire harness of the control system 36 and may be electrically connected to or plugged into the shift control device 200, thereby allowing the shift control device 200 to control and provide power to the actuator 142, 180.

At block 302, the shift control device 200 may command an actuator to move a coupling of the axle assembly to a neutral position. The shift control device 200 may automatically command the actuator 142, 180 to move the coupling 140, 182 to the neutral position or may command the actuator 142, 180 to move the coupling 140, 182 to the neutral position in response to an operator input, such as via the operator communication device 204. Movement of the coupling 140, 182 to the neutral position disconnects the electric motor 46 from the wheel hub 68 of the axle assembly 20. As a result, rotation of the wheel hub 68 or a wheel assembly 22 may not drive the electric motor 46 and optionally may not drive other components like the transmission 48, the differential assembly 42, or both, depending on where the coupling is located. Electrical energy may be provided from the device power supply 206 to the actuator 142, 180 when commanding the actuator 142, 180 to move the coupling 140, 182. Electrical energy may be provided to the actuator 142, 180 via the controller 190 of the vehicle control system 36, under the direction of the controller 190, or directly to the actuator 142, 180 independent from the controller 190 as previously discussed.

At block 304, the method determines whether the coupling 140, 182 is in the neutral position. The coupling 140, 182 may be presumed to be in the neutral position when the actuator 142, 180 is operated for a predetermined period of time. As another example, a position sensor 230 may provide a signal that is indicative of the position of the coupling 140, 182 to the shift control device 200. The position sensor 230 may directly or indirectly detect the position of the coupling 140, 182. For instance, the position sensor 230 may be part of the actuator 142, 180 and may indirectly detect the position of the coupling 140, 182. As another example the position sensor 230 may be provided with the axle assembly 20 and may directly detect the proximity or location of the coupling 140, 182. As another example, the position sensor 230 may be provided with the shift mechanism 130 and may indirectly detect the location of the coupling 140 along the axis 94, such as by detecting the rotational position of the detent linkage 144, the linkage 146, or the collar 148. An example of a position sensor 230 configured for indirect detection is shown in FIG. 5. If the coupling 140, 182 is not in the neutral position, then the method continues at block 306. If the coupling 140, 182 is in the neutral position, then the method continues at block 310.

At block 306, the method determines whether a timer has expired. The timer may measure the amount of time that the shift control device has commanded the actuator to move the coupling. For instance, the timer may be initialized at zero. The timer may start when the shift control device 200 the commands actuator to move the coupling 140, 182. The timer may expire when a predetermined period of time has been reached. The predetermined period of time may be any suitable value and may be based on vehicle development testing. For instance, the predetermined period of time may be a value at which it is expected that a shift to a neutral position would be completed. As a nonlimiting example, the predetermined period of time may be a nonzero value that may be less than 10 seconds and may be greater than the fastest expected time during which a shift to a neutral position may be completed. If the timer has not expired, then the method may continue at block 302 where the actuator 142, 180 may continue to be commanded to move the coupling 140, 182 to the neutral position. If the timer has expired, then the method may continue at block 308.

At block 308, a notification may be provided that a shift to the neutral position has not been completed. The notification may be provided to and operator via the operator communication device 204. The notification may be of any suitable type. For instance, the notification may be a visual notification, audible notification, haptic notification, or combinations thereof. Failure to shift to the neutral position may be indicative of an improperly operating actuator or mechanical binding that may inhibit movement of the coupling 140, 182.

At block 310, a notification may be provided that the shift to the neutral position has been completed. The notification may be provided to the operator via the operator communication device 204. The notification may be of any suitable type. For instance, the notification may be a visual notification, audible notification, haptic notification, or combinations thereof. In some configurations, the operator communication device 204 may be activated when the coupling 140, 182 is in the neutral position, such as by turning on an indicator light, displaying a message on a screen, providing an audible tone, providing haptic feedback, or combinations thereof. The vehicle 10 may now be towed or moved in a manner other than under its own power. The method may continue at block 312.

At block 312, the lubricant pump 192 may be operated to pump or distribute lubricant in the axle assembly 20. The lubricant pump 192 may be controlled to pump lubricant 194 and help lubricate components of the axle assembly before, during, or after the coupling 140, 182 is moved to the neutral position. The lubricant pump 192 may be operated when the shift control device 200 is electrically connected to the vehicle 10. For instance, the lubricant pump 192 may be operated when the shift control device 200 is electrically connected to the vehicle control system 36. The lubricant pump 192 may be operated when the shift control device 200 is directly or indirectly electrically connected to an actuator 142, 180. The lubricant pump 192 may be operated during towing of the vehicle 10.

The shift control device 200 may provide or control providing electrical energy to the lubricant pump 192. Electrical energy may be provided to the lubricant pump 192 from the electric energy system 30 of the vehicle 10 or the device power supply 206. The lubricant pump 192 may be operated continuously or intermittently. Operating the lubricant pump 192 may help lubricate components of the axle assembly 20 in preparation for or during towing of the vehicle 10. For instance, the lubricant pump 192 may distribute lubricant 194 in the axle housing 60 to lubricate bearings that support the axle shafts 44, bearings that support the differential assembly 42, the differential assembly 42, or other components, which may reduce wear upon these components. It is noted that the device power supply 206 may be a power supply that is provided with a tow truck or other vehicle that may tow the vehicle 10.

The present invention may allow a coupling to be actuated by a shift control device. This may allow the coupling to be manually actuated when an associated actuator is inoperative, such as in a situation in which electrical power is not available to the actuator, when the actuator is stuck or partially stuck and is impaired from moving, when a system fault exists that intentionally prevents the actuator from operating, when a controller of the vehicle control system is inoperative, or when the vehicle control system is inactive or otherwise not able to move the coupling to a neutral position.

The present invention permits a coupling to be actuated from outside the axle assembly to a neutral position or a particular gear ratio without extensive disassembly and reassembly of the axle assembly, which helps reduce time and associated costs. In addition, the present invention permits a coupling to be electrically actuated using the actuator that is associated with the coupling. This differs from configurations in which the actuator is removed to permit a tool to be installed to provide actuation force in place of the actuator, which may also avoid disassembly steps.

The present invention may allow the coupling to be position in a neutral position to decouple the vehicle wheels from upstream components, such as the electric motor, a transmission, the differential assembly, or combinations thereof. Moving the coupling to the neutral position may facilitate unpowered movement of the vehicle, such as towing of the vehicle. Moving the shift collar to the neutral position as previously described is faster and less intrusive than alternatives like removing the axle shafts or decoupling the axle shafts from the wheel end assemblies and/or the differential assembly. Moreover, decoupling the axle shafts from the wheel end assemblies and/or the differential assembly is more difficult and complex when wheel end gear reduction is provided, such as with a set of reduction gears that operatively connect the axle shaft to a wheel hub. In such configurations, the wheel end gear reduction makes access to the axle shaft and disassembly more difficult and time-consuming, which may increase costs, require extensive reassembly, and may delay towing until disassembly can be completed as compared to the present invention.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of controlling an axle assembly of a vehicle, the method comprising:
   electrically connecting a shift control device to the vehicle, wherein the shift control device is external to the vehicle; and
   commanding, with the shift control device, an actuator to move a coupling of the axle assembly to a neutral position, thereby disconnecting an electric motor from a wheel hub of the axle assembly that is configured to support a wheel, wherein the shift control device is electrically connected to a device power supply that is external to the vehicle and electrical energy is provided from the device power supply to the actuator when commanding the actuator to move the coupling.

2. The method of claim 1 wherein the axle assembly includes a differential assembly and the coupling selectively connects the wheel hub and the differential assembly.

3. The method of claim 1 wherein the axle assembly includes a differential assembly and an axle shaft that is connected to the wheel hub, wherein the coupling selectively connects the axle shaft and the differential assembly.

4. The method of claim 1 wherein the axle assembly includes a differential assembly, wherein the electric motor is disconnected from the differential assembly when the coupling is in the neutral position.

5. The method of claim 4 wherein the axle assembly includes a transmission that is operatively connected to the electric motor, and a drive pinion that is operatively connected to the differential assembly, wherein the coupling selectively connects the drive pinion to the transmission.

6. The method of claim 5 wherein the transmission is disconnected from the drive pinion when the coupling is in the neutral position.

7. The method of claim 1 wherein electrically connecting the shift control device to the vehicle includes electrically connecting the shift control device and the device power supply to a controller of a vehicle control system that is provided with the vehicle, wherein the controller is electrically connected to the actuator.

8. The method of claim 7 wherein commanding the actuator to move the coupling includes providing electrical energy from the device power supply to the actuator via the controller of the vehicle control system.

9. The method of claim 1 further comprising providing a signal indicative of a position of the coupling to the shift control device.

10. The method of claim 9 wherein the shift control device has an operator communication device and wherein the operator communication device communicates the position of the coupling based on the signal.

11. The method of claim 10 wherein the operator communication device is activated when the coupling is in the neutral position.

12. The method of claim 1 wherein the axle assembly has a lubricant pump and the method further comprises operating the lubricant pump when the shift control device is electrically connected to the actuator.

13. The method of claim 1 wherein the axle assembly has a lubricant pump and the method further comprises operating the lubricant pump when the coupling is in the neutral position.

14. The method of claim 1 wherein electrically connecting the shift control device to the vehicle includes electrically connecting the shift control device to the actuator without electrically connecting the shift control device to a controller of a vehicle control system that is provided with the vehicle.

15. The method of claim 14 wherein electrically connecting the shift control device to the vehicle includes electrically connecting the device power supply to the actuator.

16. The method of claim 1 wherein the vehicle can be towed when the coupling is in the neutral position.

17. A method of controlling an axle assembly of a vehicle, the method comprising:
   electrically connecting a shift control device to the vehicle, wherein the shift control device is external to the vehicle; and
   commanding, with the shift control device, an actuator to move a coupling of the axle assembly to a neutral position, thereby disconnecting an electric motor from a wheel hub of the axle assembly that is configured to support a wheel, wherein the axle assembly has a lubricant pump and the method further comprises operating the lubricant pump when the shift control device is electrically connected to the actuator and the lubricant pump is electrically connected to a device power supply that is external to the vehicle.

18. The method of claim 17 wherein electrical energy is provided from the device power supply to the actuator when commanding the actuator to move the coupling.

19. A method of controlling an axle assembly of a vehicle, the method comprising:
   electrically connecting a shift control device to the vehicle, wherein the shift control device is external to the vehicle; and
   commanding, with the shift control device, an actuator to move a coupling of the axle assembly to a neutral position, thereby disconnecting an electric motor from a wheel hub of the axle assembly that is configured to support a wheel, wherein the axle assembly has a lubricant pump, the lubricant pump is electrically connected to a device power supply that is external to the vehicle, and the method further comprises operating the lubricant pump when the coupling is in the neutral position.

20. The method of claim 19 wherein the device power supply provides electrical energy to the shift control device.

* * * * *